(12) United States Patent
Hosoya

(10) Patent No.: US 7,640,365 B2
(45) Date of Patent: Dec. 29, 2009

(54) HIGHLY RELIABLE DISK CONTROLLER

(75) Inventor: Mutsumi Hosoya, Fujimi (JP)

(73) Assignee: Hitachi, Ltd., Tokyo (JP)

( * ) Notice: Subject to any disclaimer, the term of this patent is extended or adjusted under 35 U.S.C. 154(b) by 14 days.

(21) Appl. No.: 11/600,985

(22) Filed: Nov. 17, 2006

(65) Prior Publication Data

US 2008/0126603 A1 May 29, 2008

(30) Foreign Application Priority Data

Sep. 26, 2006 (JP) ............................. 2006-260494

(51) Int. Cl.
*G06F 3/00* (2006.01)
*G06F 13/28* (2006.01)
*G06F 5/00* (2006.01)
(52) U.S. Cl. ............................... 710/5; 710/28; 710/36
(58) Field of Classification Search .................. 710/5
See application file for complete search history.

(56) References Cited

U.S. PATENT DOCUMENTS

| 5,841,769 | A * | 11/1998 | Okanoue et al. ............ 370/338 |
| 7,127,568 | B2 * | 10/2006 | Watanabe et al. ............ 711/154 |
| 7,496,718 | B2 * | 2/2009 | Ohno et al. ................. 711/152 |
| 2004/0139365 | A1 | 7/2004 | Hosoya |
| 2005/0182864 | A1 | 8/2005 | Hosoya et al. |
| 2006/0075187 | A1 * | 4/2006 | Nakashima et al. ......... 711/113 |

FOREIGN PATENT DOCUMENTS

| JP | 2003-242030 | | 8/2003 |
| JP | 2004-213125 | A | 7/2004 |
| JP | 2005-228245 | | 8/2005 |
| JP | 2005-250551 | A | 9/2005 |

OTHER PUBLICATIONS

Japan Patent Office (JPO) office action for JPO patent application JP2006-260494 (Nov. 11, 2008).

* cited by examiner

*Primary Examiner*—Alford W Kindred
*Assistant Examiner*—Zachary K Huson
(74) *Attorney, Agent, or Firm*—Townsend and Townsend and Crew LLP

(57) ABSTRACT

Provided is a unit for protecting data with respect to data transfer between memories of a disk controller. The disk controller for controlling data transfer between a host computer and a disk drive includes: a channel unit having a channel memory; a cache unit having a cache memory, and a control unit for controlling the data transfer. The data transferred to/from the host computer is transferred in a packet between the channel memory and the cache memory, and The control unit for verifying consistency of information included in a header of the packet to be transferred to decide whether transfer can be permitted when the packet is transferred.

18 Claims, 19 Drawing Sheets

| TRANSFER | | INTRACLUSTER TRANSFER RESTRICTIONS | INTERCLUSTER TRANSFER RESTRICTIONS |
|---|---|---|---|
| SRC | DST | | |
| HM | HM | x | x |
| | LM | CONTROL ONLY | x |
| | CM | DATA ONLY | x |
| | CMx2 | DATA ONLY | x |
| LM | HM | CONTROL ONLY | x |
| | LM | CONTROL ONLY | ← |
| | CM | o | x |
| | CMx2 | x | x |
| CM | HM | DATA ONLY | READ ONLY |
| | LM | o | READ ONLY |
| | CM | DATA ONLY | x |
| | CMx2 | x | x |

*FIG. 7*

|  | Port0 Local | Port1 Local | Port2 Local | Port3 Local | PK Global |
|---|---|---|---|---|---|
| DATA AREA | Addr:0000xxxx | Addr:0001xxxx | Addr:0010xxxx | Addr:0011xxxx | Addr:01xxxxxx |
| CONTROL AREA | Addr:1000xxxx | Addr:1001xxxx | Addr:1010xxxx | Addr:1011xxxx | Addr:11xxxxxx |

CLUSTER 0
CLUSTER 1
CLUSTER 2
CLUSTER 3

FIG. 16A

|  | MP0 Local | MP1 Local | MP2 Local | MP3 Local | MP PK Global |
|---|---|---|---|---|---|
| DATA AREA | Addr:0000xxxx | Addr:0001xxxx | Addr:0010xxxx | Addr:0011xxxx | Addr:01xxxxxx |
| CONTROL AREA | Addr:1000xxxx | Addr:1001xxxx | Addr:1010xxxx | Addr:1011xxxx | Addr:11xxxxxx |

CLUSTER 0
CLUSTER 1
CLUSTER 2
CLUSTER 3

FIG. 16B

|  | CLUSTER 0 | CLUSTER 1 | CLUSTER 2 | CLUSTER 3 |
|---|---|---|---|---|
| DATA AREA | Addr:0000xxxxxx | Addr:0001xxxxxx | Addr:0010xxxxxx | Addr:0011xxxxxx |
| CONTROL AREA | Addr:1000xxxxxx | Addr:1001xxxxxx | Addr:1010xxxxxx | Addr:1011xxxxxx |

FIG. 16C

|  | CLUSTER 0 Local |  |  |  |  |  | CLUSTER 3 Local |  |  |  |  |
|---|---|---|---|---|---|---|---|---|---|---|---|
|  | MP 0 | MP 1 |  | MP n | MP Global |  | MP 0 | MP 1 |  | MP n | MP Global |
| DATA AREA |  |  |  |  |  |  |  |  |  |  |  |
| CONTROL AREA |  |  |  |  |  |  |  |  |  |  |  |

FIG. 17C

HIGHLY RELIABLE DISK CONTROLLER

CLAIM OF PRIORITY

The present application claims priority from Japanese patent application 2006-260494 filed on Sep. 26, 2006, the content of which is hereby incorporated by reference into this application.

BACKGROUND

This invention relates to a disk controller for controlling data transfer between a host computer and a disk drive.

In recent years, a large-scale storage such as a TCO reduction by storage consolidation and strategic data utilization is gaining higher importance. As the consolidation progresses, higher scalability such as an increase in the number of ports and capacity, and improvement in performance or function in a storage device is required.

Meanwhile, there is a very high demand for a reduction in storage hardware price on the market. A storage capacity unit price has been reduced by 20% each year. To follow this trend, costs required for an entire system including an architecture of the storage device must be reduced.

As a solution for realization of both the high-scalability and low costs of the storage device, a cluster-type disk controller which cluster-connects a plurality of disk controllers has been proposed. According to the cluster-type disk controller, scalability can be greatly enhanced by interconnecting the plurality of disk controllers. By preparing the disk controllers in a number that meets user's needs, unnecessary hardware resources can be eliminated to reduce the costs. Thus, it is possible to realize both the high scalability and low costs by using the cluster-type disk controller.

For example, the background art (cluster-type disk controller) described above is disclosed in JP 2005-228245 A.

In a large-scale system such as the cluster-type disk controller, many jobs requested from a plurality of users are simultaneously executed. These jobs perform necessary processing by partially sharing or exclusively using the hardware resources in the system. In particular, a memory that is a typical hardware resource is divided spatially/temporally to be managed, and divided areas are allocated to the necessary processing. Accordingly, management of memory resources so as not to interfere with other jobs, in other words, protection of memory areas, is important.

A page table virtual storage method has been widely employed to protect data stored in the memory. According to the page table virtual storage method, a physical memory address space and access attributes (access permission, read permission, write permission, or the like) are defined for each logical memory address space, and overlapping of physical hardware resources is prevented even when a plurality of jobs share the same logical address space. Moreover, improper access is eliminated by setting an access limit for each address space.

According to a page table system, a page table is provided for each processor (job) to convert an address. Normally, a cache unit (e.g., TLB) is often provided to convert an address at a high speed. An example of memory protection by the page table system is described in JP 2003-242030 A.

SUMMARY

The large-scale disk controller based on the cluster system includes a plurality of components such as a cache unit, a channel unit, and a processor unit. These units respectively include a cache memory, a channel memory, and a processor memory. Data must be transferred among the plurality of memories to execute basic IO processing. For example, when the processor controls the channel unit, data is transferred between the processor memory and the channel memory. When data is fetched from the channel unit into the cache unit, data is transferred from the channel memory to the cache memory.

The conventional page table system defines whether a certain job (processor for executing certain job) can access a certain area, but does not provide any mechanism of protecting the memories from data transfer among a plurality of memory areas. In other words, according to the conventional art, data stored in the memories cannot be protected with respect to data transfer among the plurality of memory areas in the disk controller.

According to the large-scale disk controller of the cluster system, independence of the disk controller clusters of one another must be enhanced to increase availability of the entire system. In other words, in data transfer among the memories extended over the clusters, especially spreading of a trouble of a certain cluster to another cluster must be prevented by reliably protecting the data stored in the memories.

In this regard, the conventional art provides no special mechanism of protecting the memories when data is transferred among the clusters, making it impossible to protect the data stored in the memories of the disk controller of the cluster system.

It is an object of this invention to eliminate drawbacks of the conventional art, to provide a memory protection unit with respect to data transfer in a disk controller cluster and among disk controller clusters, and to improve reliability of the disk controller.

A representative aspect of this invention is as follows. That is, there is provided a disk controller for controlling data transfer between a host computer and a disk drive, including: a channel unit including a channel memory; a cache unit including a cache memory, and a control unit for controlling the data transfer. The data transferred to/from the host computer is transferred in a packet between the channel memory and the cache memory. The control unit decides whether transfer can be permitted by verifying consistency of information included in a header of the packet to be transferred when the packet is transferred.

According to the disk controller of this invention, it is possible to prevent improper transfer by verifying consistency of packet header information and transferring only the packet whose consistency has been checked, when packets are transferred in the disk controller.

BRIEF DESCRIPTION OF THE DRAWINGS

The present invention can be appreciated by the description which follows in conjunction with the following figures, wherein:

FIG. 7 is a diagram showing a definition example of transfer restriction conditions of the disk controller of the first embodiment of this invention;

FIG. 16A is a diagram showing a divided memory area according to a fourth embodiment of this invention;

FIG. 16B is a diagram showing the divided memory area according to the fourth embodiment of this invention;

FIG. 16C is a diagram showing the divided memory area according to the fourth embodiment of this invention;

FIG. 17C is a diagram showing the divided memory area according to the fourth embodiment of this invention.

DETAILED DESCRIPTION OF THE PREFERRED EMBODIMENTS

Figure 1:
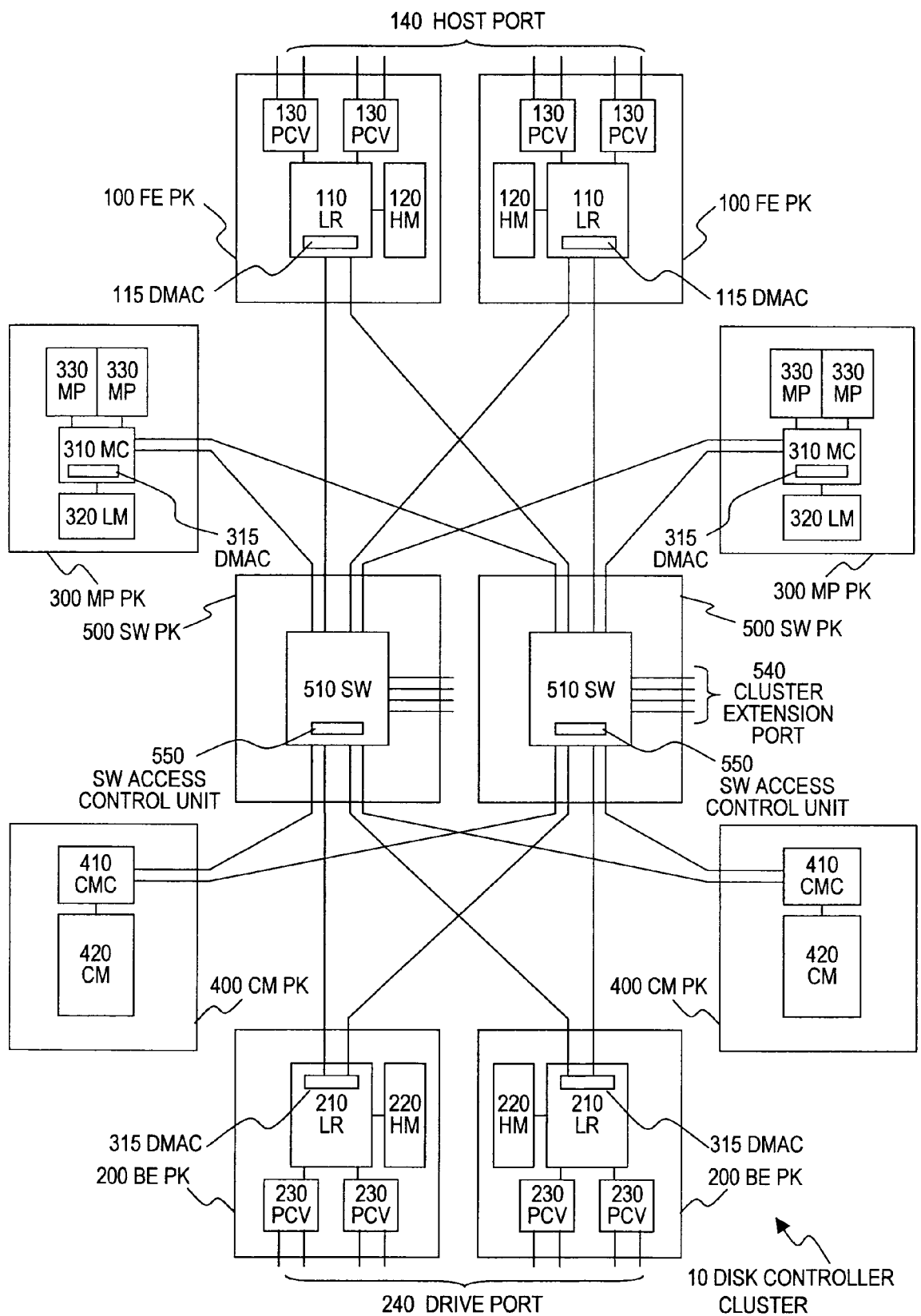
FIG. 1 is a block diagram showing a configuration of a disk controller according to a first embodiment of this invention.

Referring to the drawings, the preferred embodiment of this invention will be described below.

First Embodiment

FIG. 1 shows a configuration of a disk controller (one cluster) according to a first embodiment of this invention.

A disk controller cluster 10 includes front-end units (FE PK) 100 having host ports 140, back-end units (BE PK) 200 having drive ports 240, processor units (MP PK) 300, cache units (CM PK) 400, and switch units (SW PK) 500.

Figure 12:
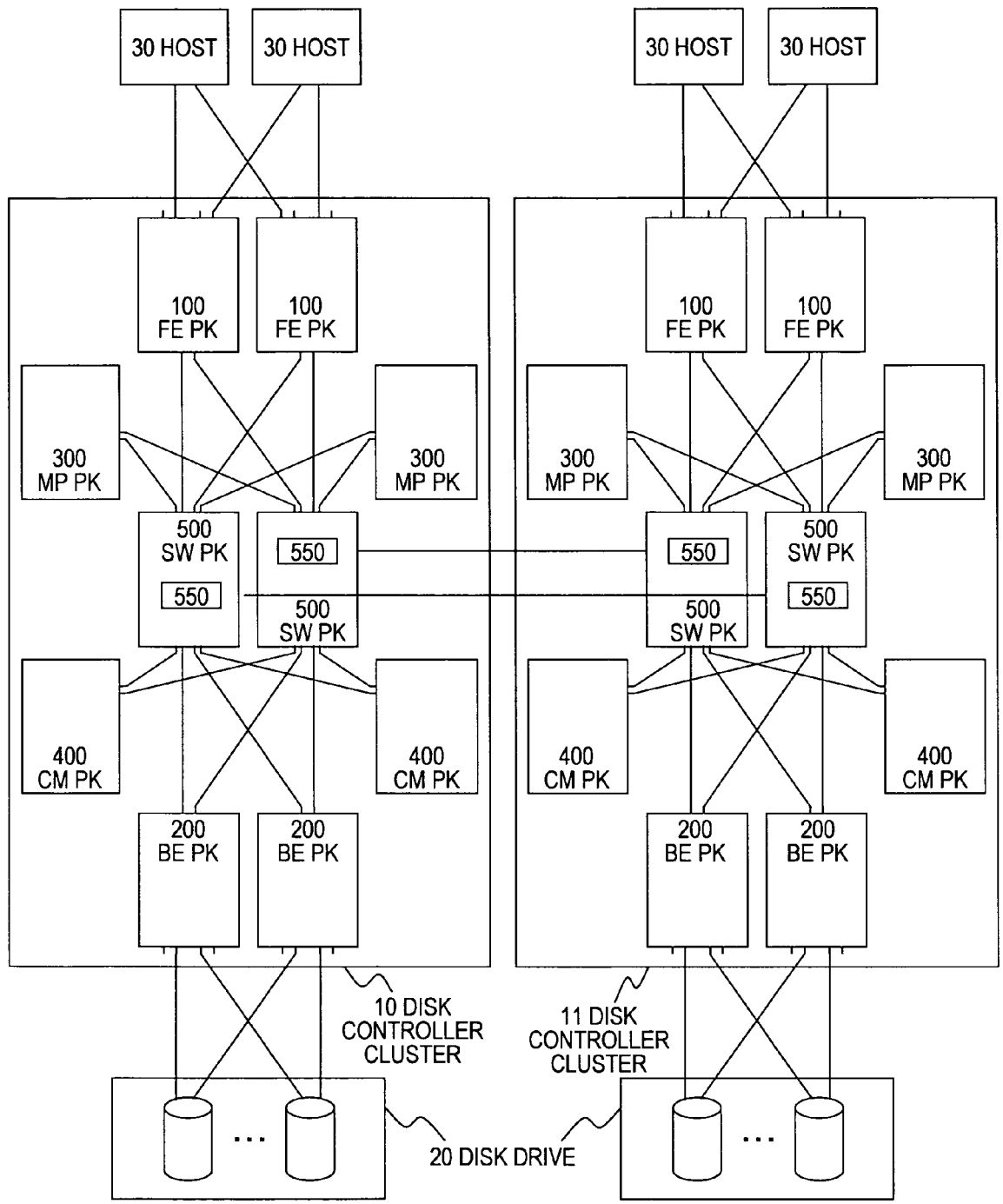
FIG. 12 is a block diagram showing a schematic configuration of a disk controller according to a third embodiment of this invention.

The front-end unit 100 includes protocol engines (PCV) 130 for controlling a channel protocol, a channel memory (HM) 120 for storing data or the like used by the protocol engines 130, a hub (LR) 110 for communicating with other units, and a DMA controller (DMAC) 115 for controlling data transfer from the channel memory 120. For example, the front-end unit 100 is connected to a host computer 30 as shown in FIG. 12.

The back-end unit 200 includes protocol engines (PCV) 230 for controlling a channel protocol, a channel memory (HM) 220 for storing data or the like used by the protocol engines 230, a hub (LR) 210 for communicating with other units, and a DMA controller (DMAC) 215 for controlling data transfer from the channel memory 220. For example, the back-end unit 200 is connected to a disk drive 20 as shown in FIG. 12.

The processor unit 300 includes processors (MP) 330, a processor memory (LM) 320 for storing data or the like used by the processors 330, a memory controller (MC) 310 for communicating with other units, and a DMA controller (DMAC) 315 for controlling data transfer from the processor memory 320. The cache unit 400 includes a cache memory (CM) 420 and a memory controller (CMC) 410 for communicating with other units.

The switch unit 500 includes a switch (SW) 510 for interconnecting the front-end unit 100, the back-end unit 200, the processor unit 300, and the cache unit 400. The switch 510 includes a cluster extension port 540 for connecting other clusters. The switch 510 additionally includes a switch access control unit 550 for protecting data transfer between memories.

Figure 2:
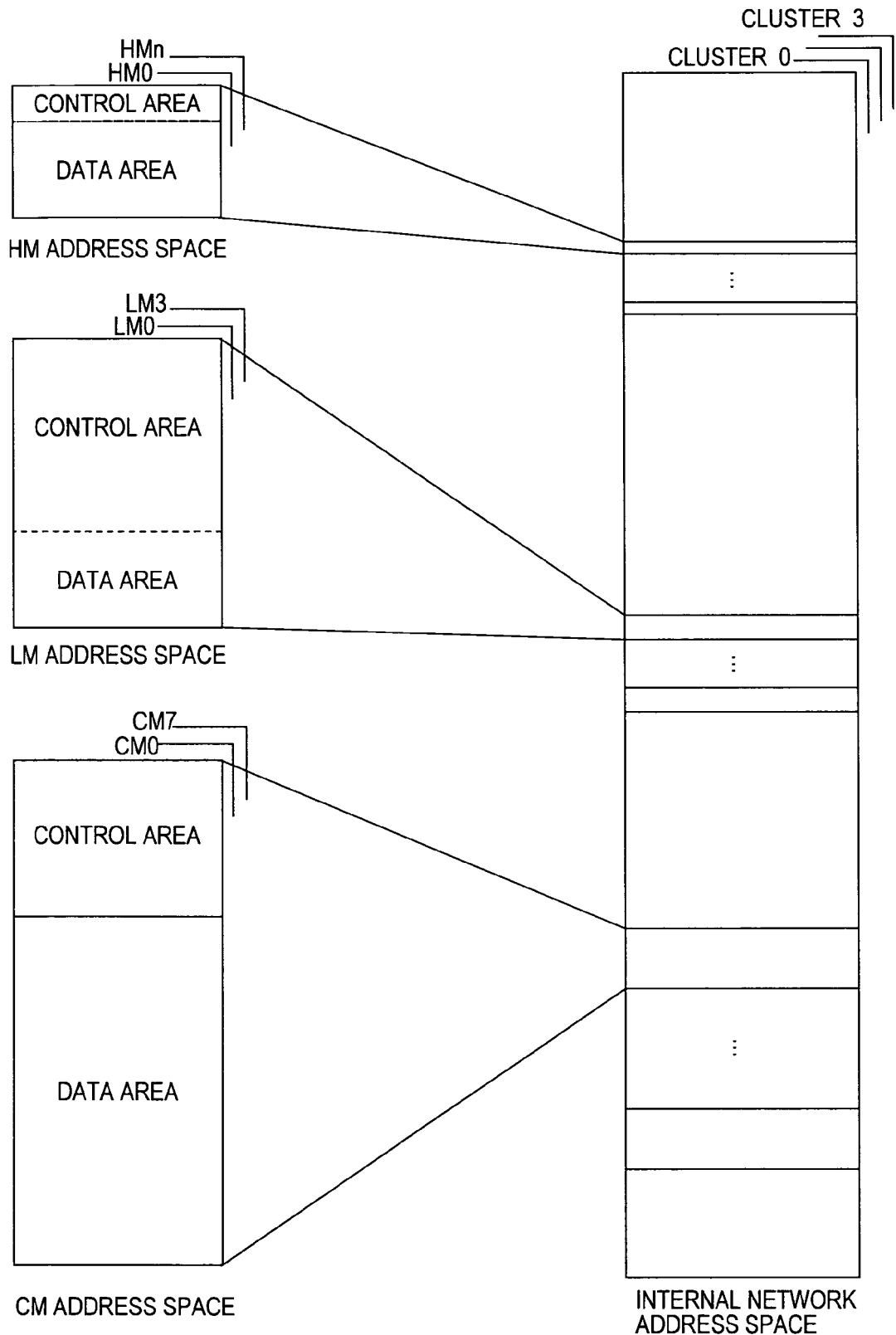
FIG. 2 is a diagram showing an internal network address space of the disk controller of the first embodiment of this invention.

In the disk controller cluster 10, the switch 510 constitutes an internal network for interconnecting the front-end unit 100, the back-end unit 200, the processor unit 300, and the cache unit 400. Through the internal network, those components and memories installed in the units are interconnected via the switch 510. To uniquely specify a memory space in the internal network, a memory address space of each unit is mapped in an internal network address space. FIG. 2 shows the mapped memory addresses. Unique internal network addresses are allocated to a plurality of channel memories 120, processor memories 320, and cache memories 420. Accordingly, by specifying an address of the internal network, a memory area can be uniquely specified including other components in a cluster to which its target belongs.

Figure 3:
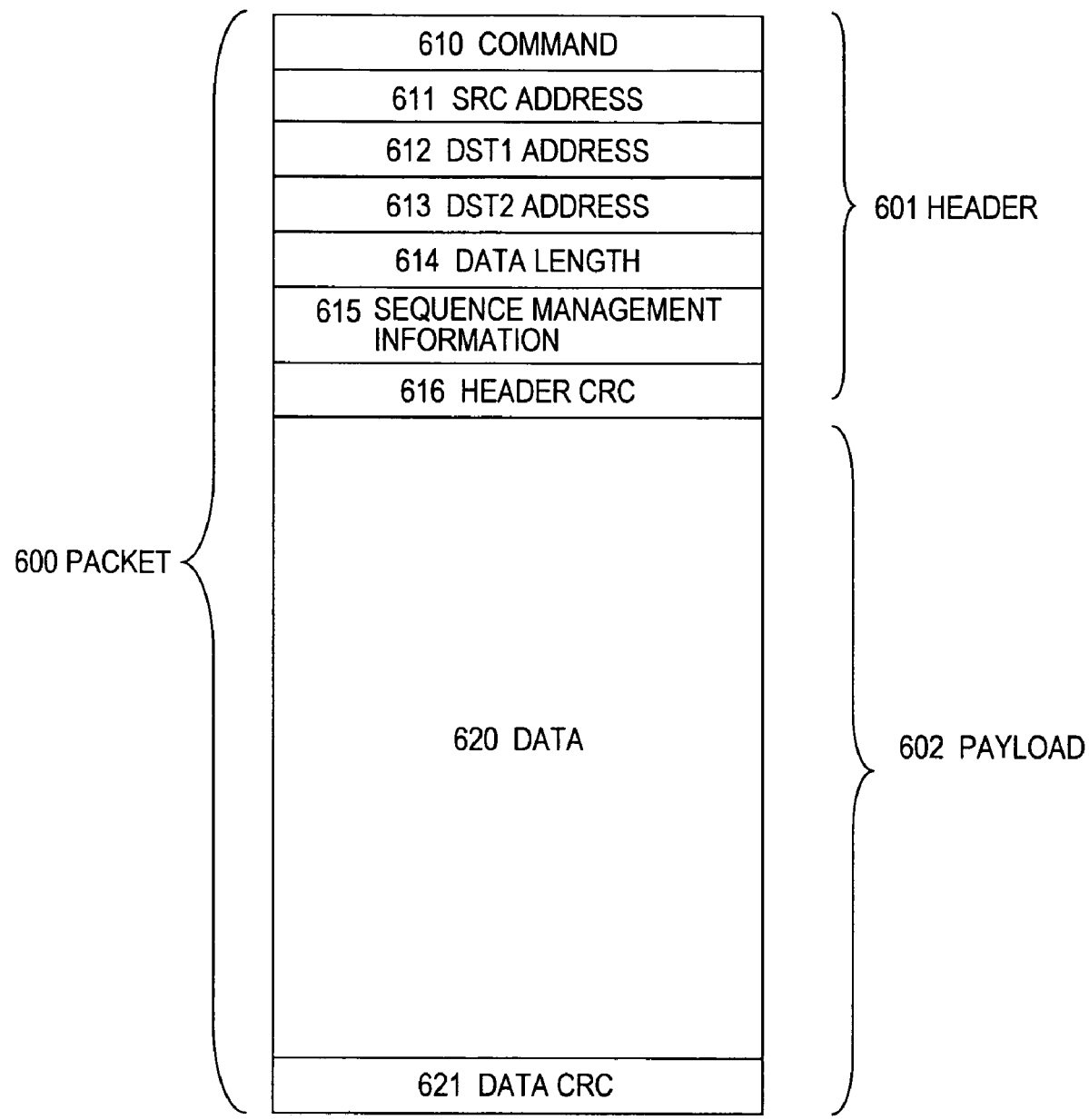
FIG. 3 is a diagram showing a configuration of an internal network packet used in the disk controller of the first embodiment of this invention.

FIG. 3 shows a configuration of a packet used for internal network transfer according to the first embodiment.

A packet 600 includes a header 601 and a payload 602. The header 601 contains a command 610, a transfer source address 611, a first transfer destination address 612, a second transfer destination address 613, a data length 614, packet sequence management information 615, and a header check code 616. The payload contains data 620 and a data check code 621.

During an IO processing operation of the disk controller, data is transferred among the channel memory 120, the processor memory 320, and the cache memory 420 by using the internal network packet. For example, WRITE data from the host computer is temporarily stored (buffered) in the channel memory 120 of the front-end unit 100, and then transferred to the cache memory 420. At a proper timing, after the data is transferred from the cache memory 420 to the channel memory 220 of the back-end unit 200, the transferred data is written in the disk drive 20. To control the channel of the front-end unit 100 and the back-end unit 200, the processor 330 transfers data between the channel memories 120 and 220 and the processor memory 320.

In the disk controller of this embodiment, checking is made on whether execution of the data transfer is to be permitted by using the command 610, the transfer source address 611, and the transfer destination addresses 612 and 613 of the internal network packet in transferring the data between those memories. The transfer is executed only when the data transfer is permitted. The transfer is canceled as an error when the data transfer is not permitted.

Next, referring to FIGS. 4 and 5, an operation of data transfer protection among the memories by the switch access control unit 550 of the first embodiment will be described.

Figure 4:
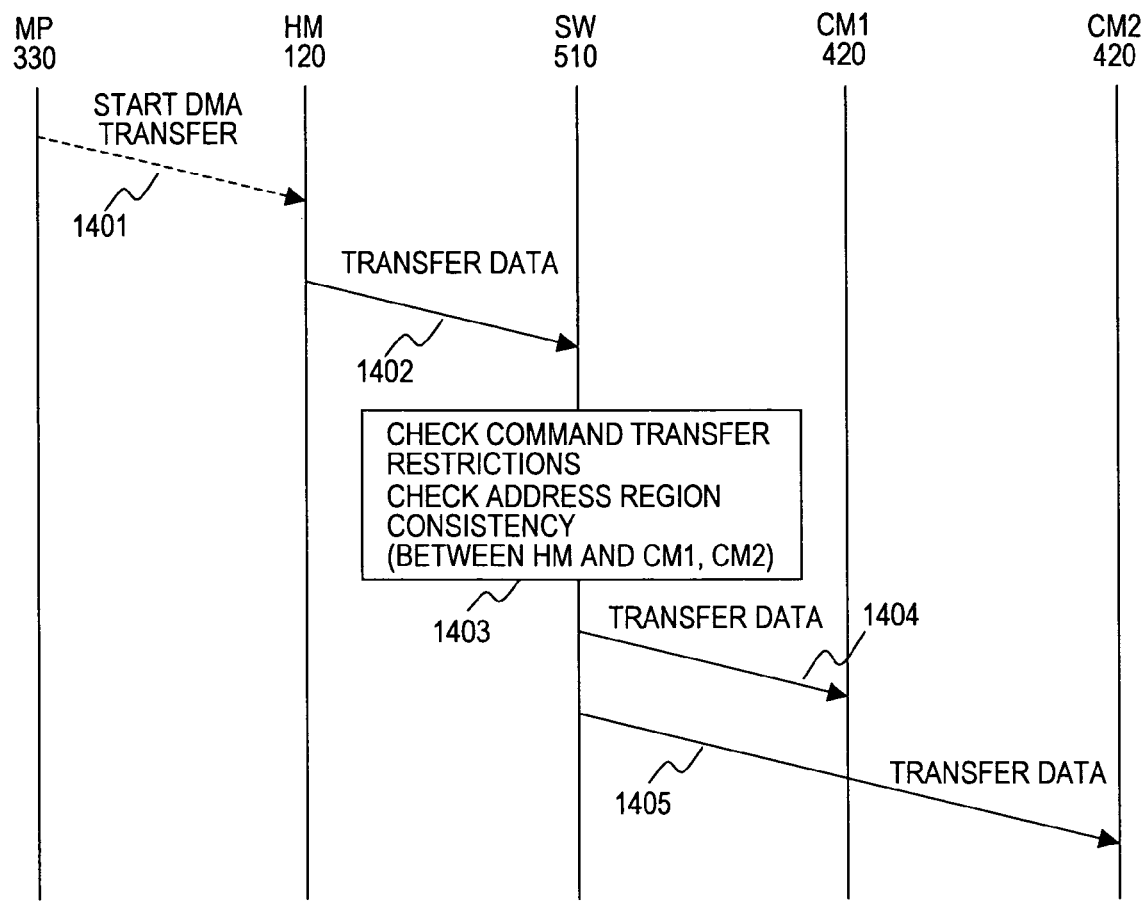
FIG. 4 is a sequence diagram showing data transfer between memories of the disk controller of the first embodiment of this invention.

FIG. 4 is a sequence diagram of data transfer protection by the switch 510 when data is transferred from the channel memory (HM) to two cache memories (CM1 and CM2) according to the first embodiment.

When the processor (MP) 330 starts DMA transfer to the front-end unit 100 (1401), a packet is transferred from the channel memory (HM) 120 to the two cache memories (CM1 and CM2) 420 via the switch (SW) 510 (1402). Though not shown, before the start of the DMA transfer (1401), a DMA transfer parameter necessary for the DMA transfer is created in the processor memory 320, and the created parameter is transferred from the processor memory 320 to the channel memory 120 (see 1201 and 1202 of FIG. 14).

When the packet is transferred to the cache memory 420, by the switch 510, the header 601 of the packet is analyzed to obtain a transfer command, a transfer source memory address, and a transfer destination memory address. Then, area attributes of the transfer source memory address and the transfer destination memory address are obtained from the transfer source memory address and the transfer destination memory address which have been obtained. In the example shown in FIG. 4, a transfer command is cache dual WRITE.

The switch access control unit 550 judges whether a combination of the transfer command, the transfer source address, and the transfer destination address is correct, to thereby decide whether to execute transfers 1404 and 1405 (1403). In other words, judgment is made on whether the transfer source address is included in an area where data transfer by the cache dual WRITE command is permitted, and whether the transfer destination address is included in an area where data transfer by the cache dual WRITE command is permitted.

It should be noted that data to be transferred by the switch 510 has been copied in the transfer processing. Accordingly, access checking needs to be executed only once by the switch 510.

Figure 5:
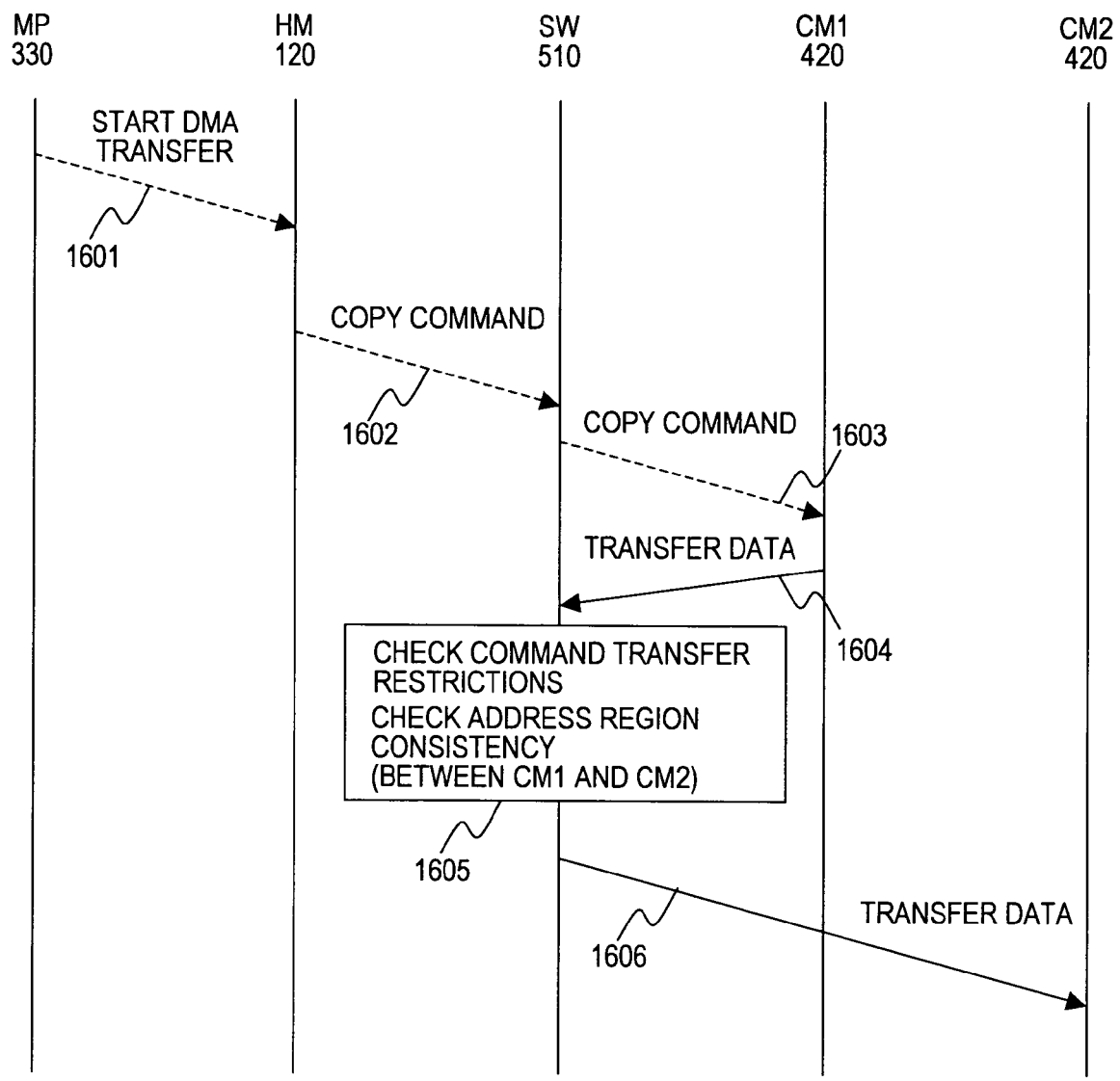
FIG. 5 is a sequence diagram showing the data transfer between the memories of the disk controller of the first embodiment of this invention.

FIG. 5 is a sequence diagram of data transfer protection by the switch 510 when data is transferred from the cache memory (CM1) to another cache memory (CM2) according to the first embodiment.

When the processor (MP) 330 starts DMA transfer to the front-end unit 100 (1601), control is executed to start data transfer by transmitting a copy command to the cache unit 400 (1602 and 1603). Though not shown, before the start of the DMA transfer (1401), a DMA transfer parameter necessary for the DMA transfer is created in the processor memory 320, and the created parameter is transferred from the processor memory 320 to the channel memory 120 (see 1201 and 1202 of FIG. 14).

Upon reception of the copy command by the cache memory (CM1), data transfer is started between the memories CM1 and CM2 via the switch (SW) 510 (1604). In this case, as in the aforementioned case, by the switch 510 provided on a memory transfer path, the packet header 601 is analyzed to obtain area attributes of the transfer command (intercache COPY) and the transfer source memory address (CM1), and area attributes of the transfer destination memory address (CM2). The switch access control unit 550 judges whether the combination of the transfer command, the transfer source address, and the transfer destination address is correct, to thereby decide whether to execute the transfer 1606 (1605). In other words, judgment is made on whether the transfer source address is included in an area where data transfer by the intercache COPY command is permitted, and on whether the transfer destination address is included in an area where the data transfer by the intercache COPY command is permitted.

Figure 6:
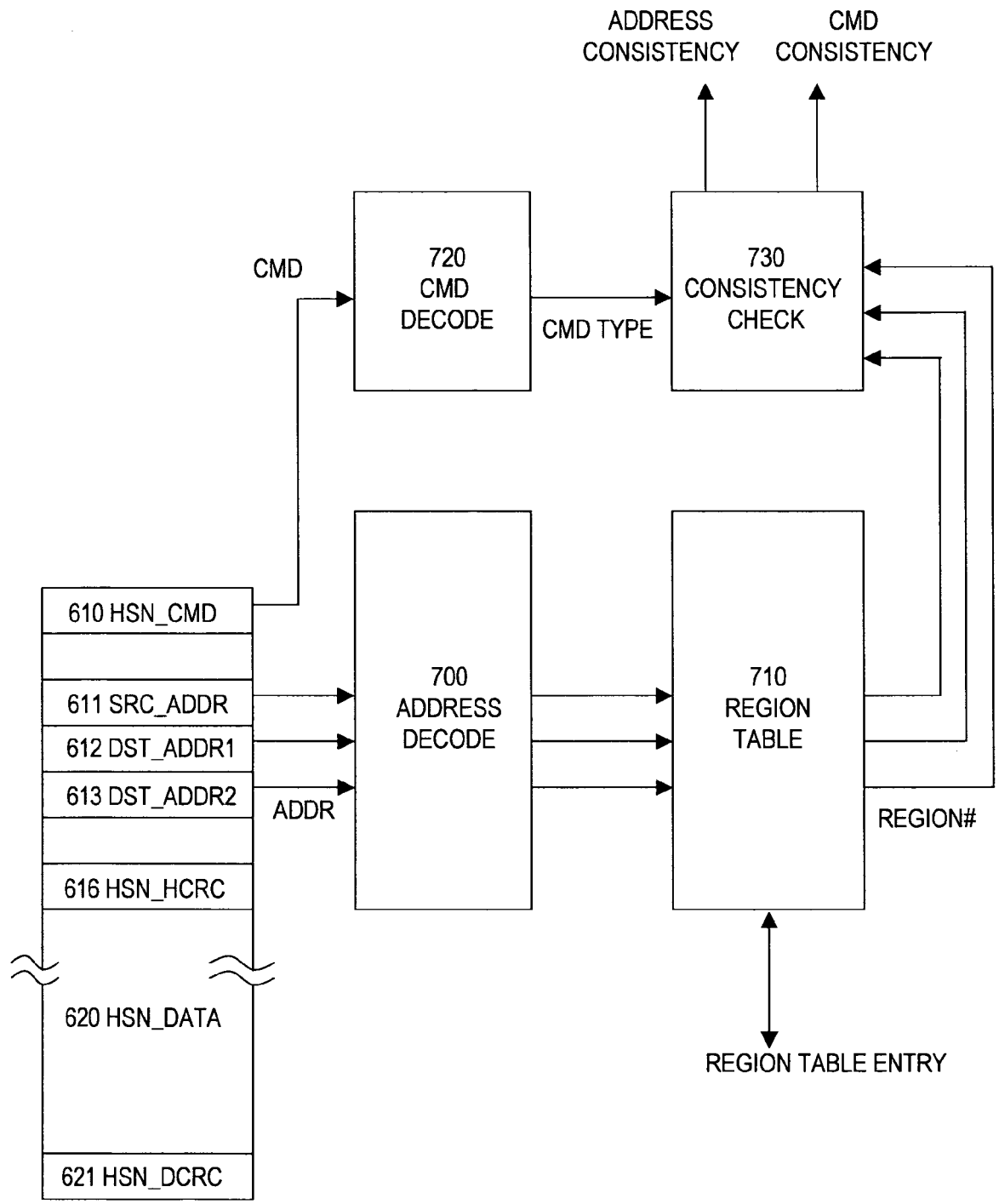
FIG. 6 is a block diagram showing a configuration of an access control unit according to the first embodiment of this invention.

FIG. 6 shows a configuration of the access control unit 550 of the first embodiment.

The access control unit 550 includes an address decode logic 700 (ADDRESS DECODE) for analyzing an address, an address area table 710 (REGION TABLE) for holding a relation between a memory address and area attributes, a command decode logic 720 (CMD DECODE) for analyzing a command, and a consistency check logic 730 (CONSISTENCY CHECK) for verifying address and command consistency.

The address decode logic 700 analyzes the transfer source address 611, the first transfer destination address 612, and the second transfer destination address 613, and refers to the address area table 710 to specify areas to which the addresses belong and attributes of the areas (REGION #). The consistency check logic 730 verifies consistency between attributes of the specified areas to output an address consistency result. For example, when attributes of the transfer source and destination areas match each other, both attributes are judged to be consistent and data transfer is permitted.

The command decode logic 720 analyzes the transfer command 610. The consistency check logic 730 verifies the consistency between attributes of the areas specified by the address decode logic 700 and a command to output a command consistency result.

The consistency check logic 730 may be configured to be separated into a command consistency check logic and an address consistency check logic. In this case, the command consistency check logic checks consistency between a command and an address, while the address consistency check logic checks consistency between a transfer source address and a transfer destination address. In this way, consistency check processing can be distributed to increase a processing speed.

According to this embodiment, the access control unit 550 is composed of hardware. However, it may be composed of software executed by the processor.

FIG. 7 shows a definition example of transfer restriction conditions according to the first embodiment. The transfer restriction conditions are held in the consistency check logic 730. However, any place can hold the restrictions as long as they can be referred to by the consistency check logic 730.

In the definition example of the transfer restriction conditions shown in FIG. 7, regarding data transfer from the channel memory to the processor memory in a cluster, data transfer alone between control areas is permitted. Regarding transfer from the cache memory to another cache memory in the cluster, data transfer alone between the data areas is permitted. Thus, by setting the transfer restriction conditions, illegal transfer is prevented, thereby making it possible to protect data stored in the memory and to obtain high reliability of the disk controller.

FIG. 7 also shows transfer restriction conditions between clusters, which will be described below in a third embodiment.

Figure 8:
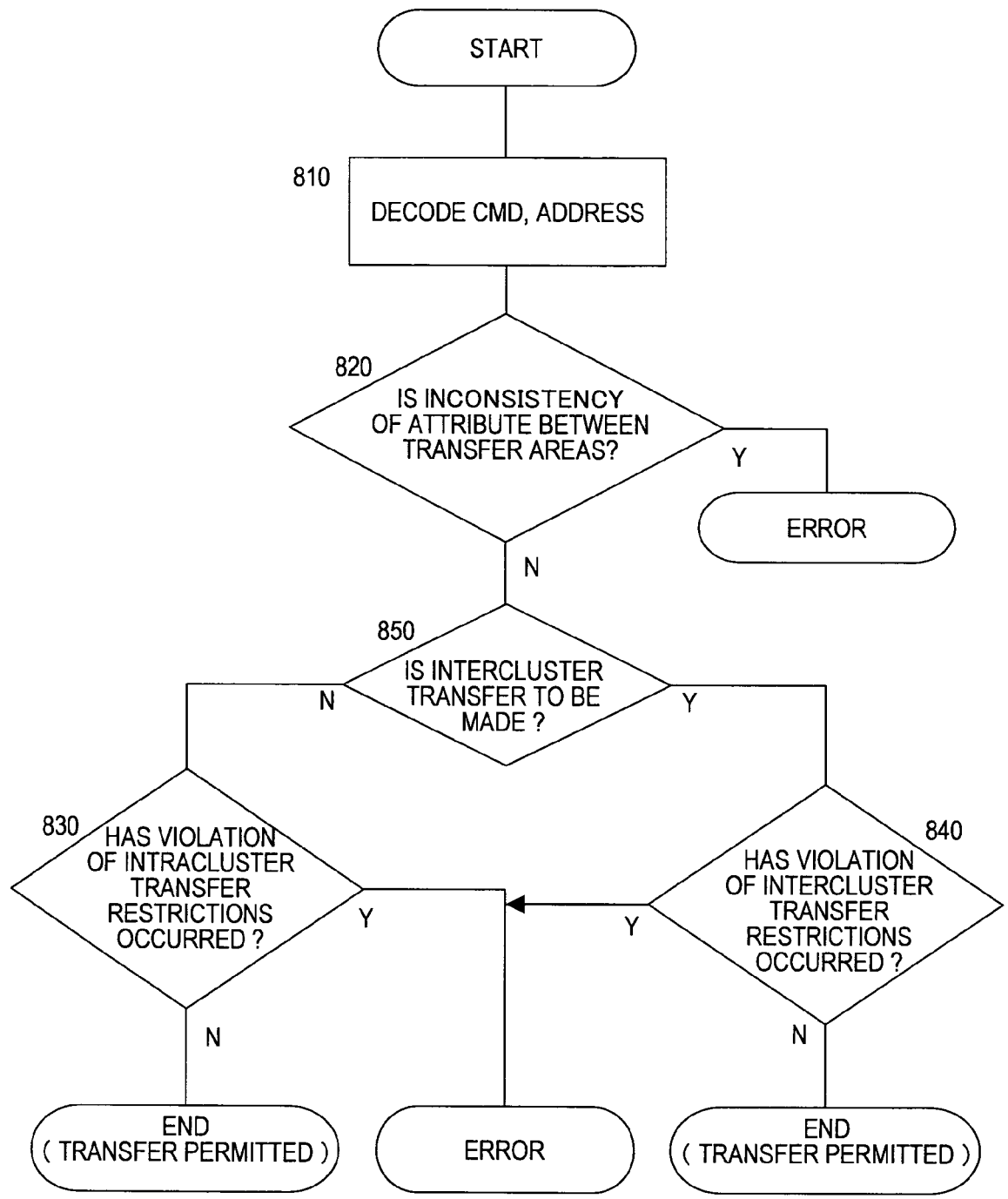
FIG. 8 is a flowchart showing an operation of the access control unit of the first embodiment of this invention.

FIG. 8 is a flowchart showing an operation of the access control unit 550 of the first embodiment.

The access control unit 550 decodes a transfer command by the command decode logic 720, and transfer source and destination addresses by the address decode logic 700. Then, attributes of areas specified by the transfer source and destination addresses are specified (810). Judgment is made by the consistency check logic 730 on whether the attributes of the transfer source and destination areas match each other (820). When the attributes of both areas do not match each other, it is judged as an error.

On the other hand, when the attributes of both areas match each other, judgment is made by the consistency check logic 730 on whether to perform intracluster transfer or intercluster transfer (850). This judgment is based on whether a command is an in-cluster transfer command or an intercluster transfer command.

As a result, in the case of the in-cluster transfer, judgment is made as to whether in-cluster transfer restriction conditions are satisfied (830). When the in-cluster transfer restriction conditions are not satisfied, it is judged as an error. When the in-cluster transfer restriction conditions are satisfied, data transfer is permitted. On the other hand, in the case of the intercluster transfer, judgment is made as to whether intercluster transfer restriction conditions are satisfied (840). When the intercluster transfer restriction conditions are not satisfied, it is judged as an error. When the intercluster transfer restriction conditions are satisfied, data transfer is permitted.

As described above, according to the disk controller of the first embodiment, when the packet is transferred via the internal network, the access control unit verifies consistency of the packet header information, and transfers only the consistency-checked packet. Thus, it is possible to prevent improper transfer and to achieve higher reliability of the disk controller. In particular, by installing the access control unit 550 in the switch 510, it is possible to verify the packet header information consistency in the switch unit. In other words, by executing access control via the switch unit alone, data transfer between the memories can be verified in a concentrated manner. Thus, it is possible to reduce costs of the disk controller.

According to the disk controller of the first embodiment, the attributes of the packet transfer source and destination areas are specified based on the packet transfer source address and the transfer destination address. Then, by deciding whether to permit transfer based on the packet transfer command and the attributes of the transfer source and destination areas, it is possible to judge whether to permit packet transfer based on only the information contained in the transferred packet.

Further, according to the disk controller of the first embodiment, the transfer restriction conditions defining transfer permission are held based on the relation among the attributes of the transfer source area, the attributes of the transfer destination area, and the packet transfer command. The transfer restriction conditions are referred to to execute only the permitted transfer. Thus, it is possible to realize a finer memory protection unit.

Second Embodiment

Figure 9:
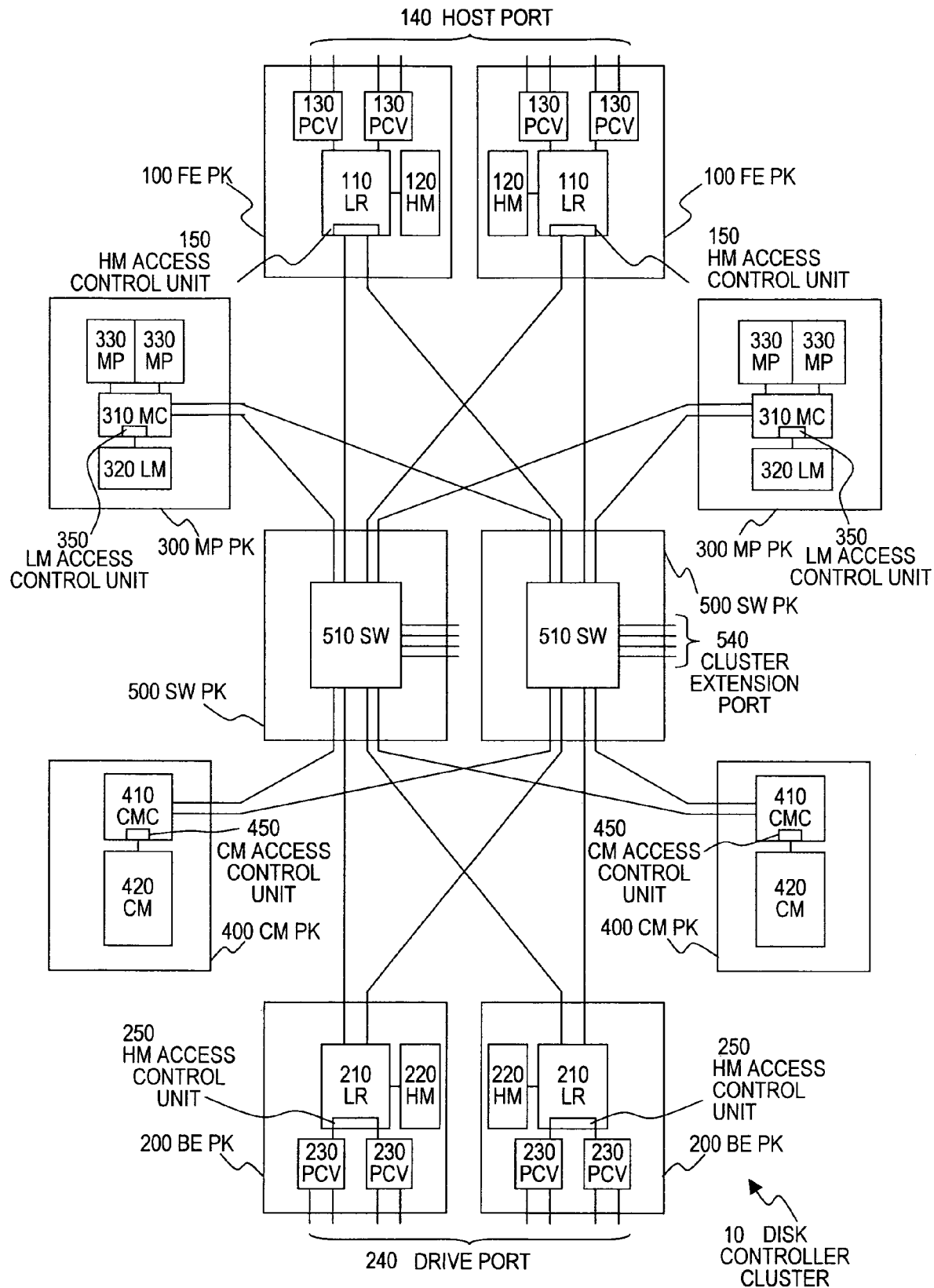
FIG. 9 is a block diagram showing a configuration of a disk controller according to a second embodiment of this invention.

FIG. 9 shows a configuration of a disk controller (one cluster) according to a second embodiment of this invention.

In a disk controller cluster 10 of the second embodiment shown in FIG. 9, a cache memory controller 410 includes a cache memory access control unit 450. Similarly, hubs 110 and 210 respectively include channel memory access control units 150 and 250, and a processor memory controller 310 includes a processor memory access control unit 350.

Next, referring to FIGS. 10 and 11, an operation of data transfer protection among memories by the cache memory access control unit 450 of the second embodiment will be described.

Figure 10:
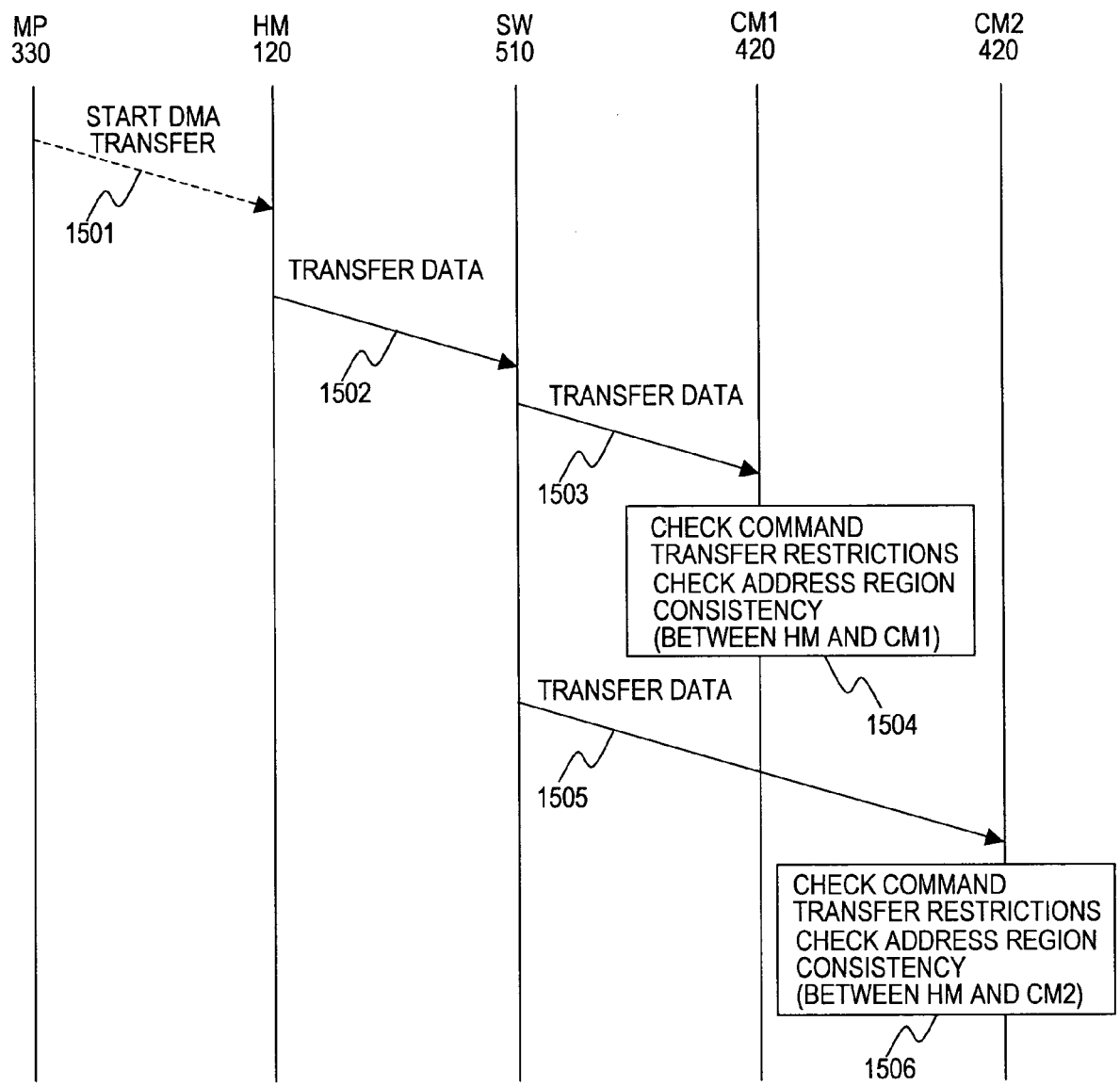
FIG. 10 is a sequence diagram showing data transfer between memories of the disk controller of the second embodiment of this invention.

FIG. 10 is a sequence diagram of data transfer protection by the cache memory access control unit 450 when data is transferred from a channel memory (HM) to two cache memories (CM1 and CM2) according to the second embodiment.

When a processor (MP) 330 starts DMA transfer to a front-end unit 100 (1501), a packet is transferred from the channel memory (HM) 120 to the two cache memories (CM1 and CM2) via a switch (SW) 510 (1502). Though not shown, before the start of the DMA transfer (1501), a DMA transfer parameter necessary for the DMA transfer is created in a processor memory 320, and the created parameter is transferred from the processor memory 320 to the channel memory 120 (see 1201 and 1202 of FIG. 14).

When the packet is transferred to the cache memory 420, by each cache memory, a header 601 of the packet is analyzed to obtain a transfer command, a transfer source memory address, and a transfer destination memory address (CM1 or CM2). Then, area attributes of the transfer source memory address and the transfer destination memory address are obtained from the transfer source and destination memory addresses which have been obtained. In the example shown in FIG. 10, a transfer command is cache dual WRITE.

The cache memory access control unit 450 of the CM1 judges whether the combination of the transfer command, the transfer source address, and the transfer destination address is correct, to thereby decide whether to execute transfer 1503 (1504). In other words, judgment is made on whether the transfer source address is included in an area where data transfer by the cache dual WRITE command is permitted, and whether the transfer destination address is included in an area where data transfer by the cache dual WRITE command is permitted.

As a result, when the transfer is judged to be permitted, the memory controller 410 writes data transferred from the switch 510 (1503) in the cache memory 420. On the other hand, when the transfer is judged to be inhibited, the data transferred from the switch 510 (1503) is discarded without being written in the cache memory 420.

Similarly, the cache memory access control unit 450 of the CM2 judges whether the combination of the transfer command, the transfer source address, and the transfer destination address is correct, to thereby decide whether to execute transfer 1505 (1506).

As a result, when the transfer is judged to be permitted, the memory controller 410 writes the data transferred from the switch 510 (1505) in the cache memory 420. On the other hand, when the transfer is judged to be inhibited, the data transferred from the switch 510 is discarded without being written in the cache memory 420.

When the cache memory access control unit 450 judges inhibition of the transfer, the data may be discarded without being written in the cache memories (CM1 and CM2) 420. In other words, when transfer is permitted by the cache memory access control units 450 of both of the cache memories, dual WRITE is executed for the cache memories (CM1 and CM2) 420.

Figure 11:
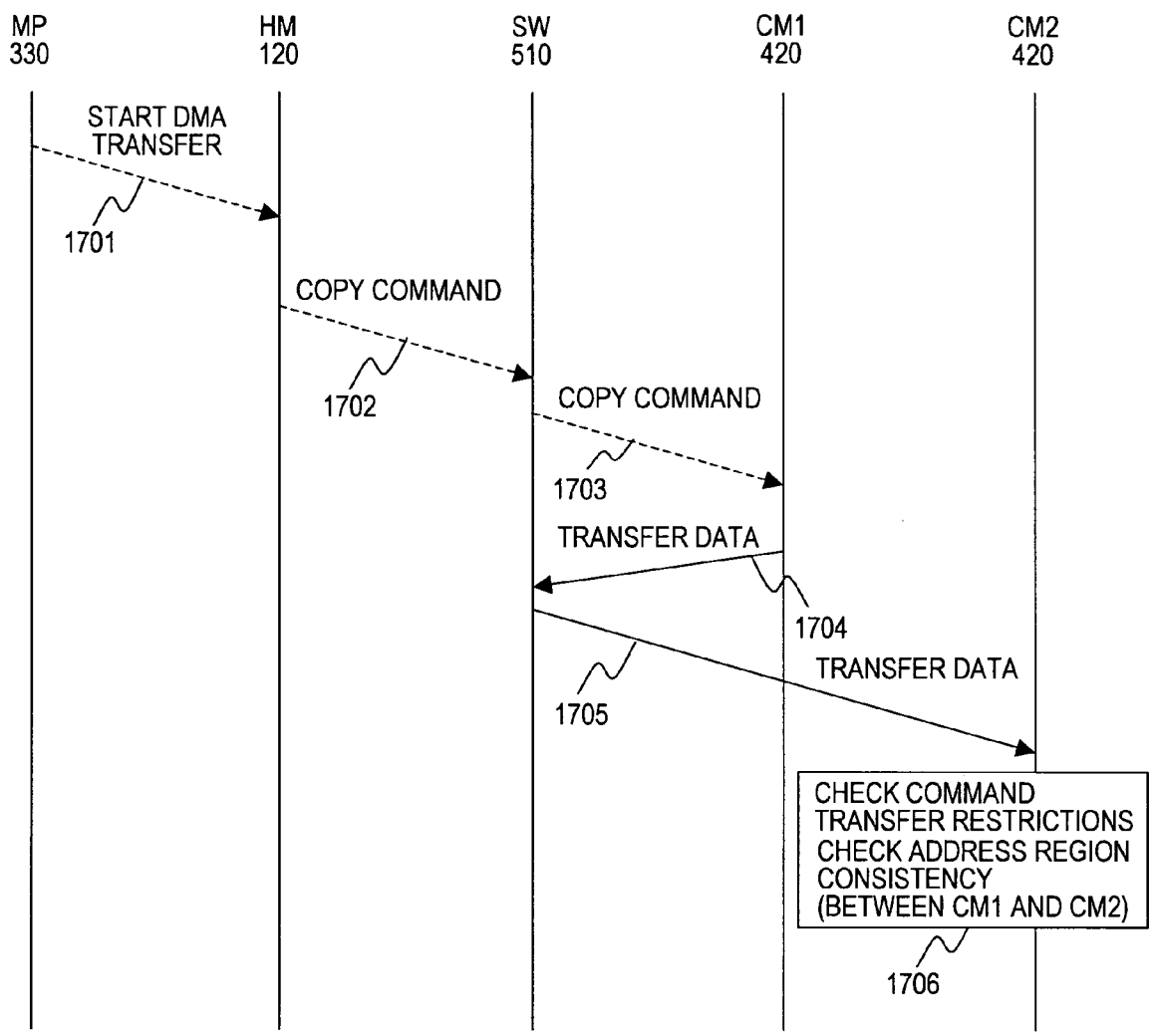
FIG. 11 is a sequence diagram showing the data transfer between the memories of the disk controller of the second embodiment of this invention.

FIG. 11 is a sequence diagram of data transfer protection by the cache memory access control unit 450 when data is transferred from the cache memory (CM1) to another cache memory (CM2) according to the second embodiment.

When the processor (MP) 330 starts DMA transfer to the front-end unit 100 (1701), control is executed to start data transfer by transmitting a copy command to the cache unit 400 (1702 and 1703). Though not shown, before the start of the DMA transfer (1701), a DMA transfer parameter necessary for the DMA transfer is created in the processor memory 320, and the created parameter is transferred from the processor memory 320 to the channel memory 120 (see 1201 and 1202 of FIG. 14).

Upon reception of the copy command by the cache memory (CM1), data transfer is started between the memories CM1 and CM2 via the switch (SW) 510 (1703). In this case, as in the aforementioned case, by the cache memory access control unit 450 of the destination cache memory (CM2), the packet header 601 is analyzed to obtain the transfer command (intercache COPY) and area attributes of the transfer source memory address (CM1) and area attributes of the transfer destination memory address (CM2). The switch access control unit 550 judges whether the combination of the transfer command, the transfer source address, and the transfer destination address is correct, to thereby decide whether to execute transfer 1660 (1704 and 1705). In other words, judgment is made on whether the transfer source address is included in an area where data transfer by the intercache COPY command is permitted, and whether the transfer destination address is included in an area where the data transfer by the intercache COPY command is permitted.

As a result, when the transfer is judged to be permitted, the memory controller 410 writes data transferred from the switch 510 (1705) in the cache memory 420. On the other hand, when the transfer is judged to be inhibited, the data transferred from the switch 510 (1705) is discarded without being written in the cache memory 420.

As described above, according to the disk controller of the second embodiment, the memories can be protected in data transfer between the memories. The memory access control unit (e.g., cache memory access control unit 450 of the cache memory controller 410) of the transfer destination memory is installed. Accordingly, by verifying consistency of packet header information at one of the channel unit, the cache unit, and the processor unit, it is possible to protect data transfer between the memories in a distributed manner. In particular, because it is checked whether transfer by the memory access control unit of the memory in which data is written is permitted, checking immediately before writing in the memory becomes possible to realize higher reliability.

According to the disk controller of the second embodiment, consistency of the data transfer is verified by the memory access control unit installed in the memory of the transfer destination. However, the consistency of the data transfer may be verified by the memory access control unit installed in the memory of the transfer source. In this case, it is preferable to verify the consistency of the data transfer by the memory access control unit of the transfer destination at the time of data transfer requiring high reliability, and to verify the consistency of the data transfer by the memory access control unit of the transfer source at the time of data transfer requiring a normal level of reliability.

The above first and second embodiments can be present in a mixed manner as the disk controller. In other words, the switch unit 500 includes the switch access control unit 550, the cache unit 400 includes the cache memory access control unit 450, the front-end unit 100 includes the channel memory access control unit 150, the back-end unit 200 includes the channel memory access control unit 250, and the processor unit 300 includes the processor memory access control unit 350. One or more memory access control units may be installed.

Then, permission of transfer may be checked by both of the switch access control unit 550 and the memory access control unit of the data transfer destination memory.

Permission of transfer may also be checked by one of the switch access control unit 550 and the memory access control unit of the data transfer destination memory according to a command type and/or a data transfer destination. For example, permission of transfer may be checked by the cache memory access control unit 450 in the case of data transfer to the cache unit, and by the switch access control unit 550 in the case of data transfer to other units.

Third Embodiment

FIG. 12 shows a configuration of a disk controller including a plurality of clusters according to a third embodiment of this invention.

A disk controller cluster 10 includes front-end units (FE PK) 100 connected to host computers (HOST) 30, back-end units (BE PK) 200 connected to disk drives 20, processor units (MP PK) 300, cache units (CM PK) 400, and switch units (SW PK) 500. The disk controller clusters 10 and 11 are interconnected by the switch units 500 included in each of the disk controller clusters. Each of the switch units 500 includes a switch access control unit 550.

Figure 13:
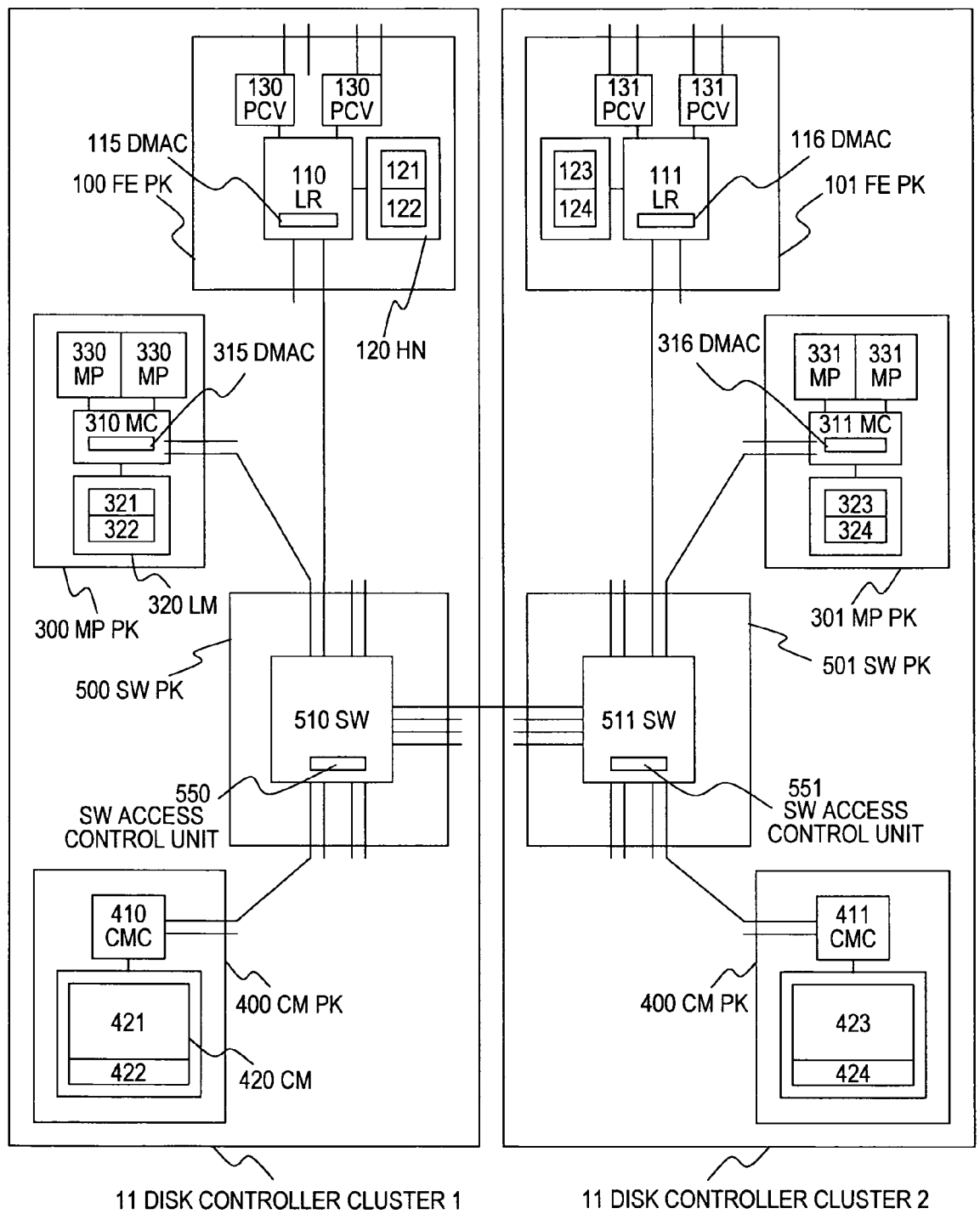
FIG. 13 is a block diagram showing a detailed configuration of the disk controller of the third embodiment of this invention.

As shown in FIG. 13, the disk controller of the third embodiment includes DMA controllers 115, 116, 315, and 316 for transferring data between memories (from channel memories 121 and 122 to cache memories 321 and 322, for example).

In the disk controller of the third embodiment, the switch access control unit 550 checks whether data transfer between the memories can be performed. Transfer is executed only when the data transfer is permitted. When the data transfer is not permitted, it is judged as an error and the transfer is canceled. Accordingly, it is possible to protect data stored in the memory even at the time of data transfer between clusters.

Figure 14:
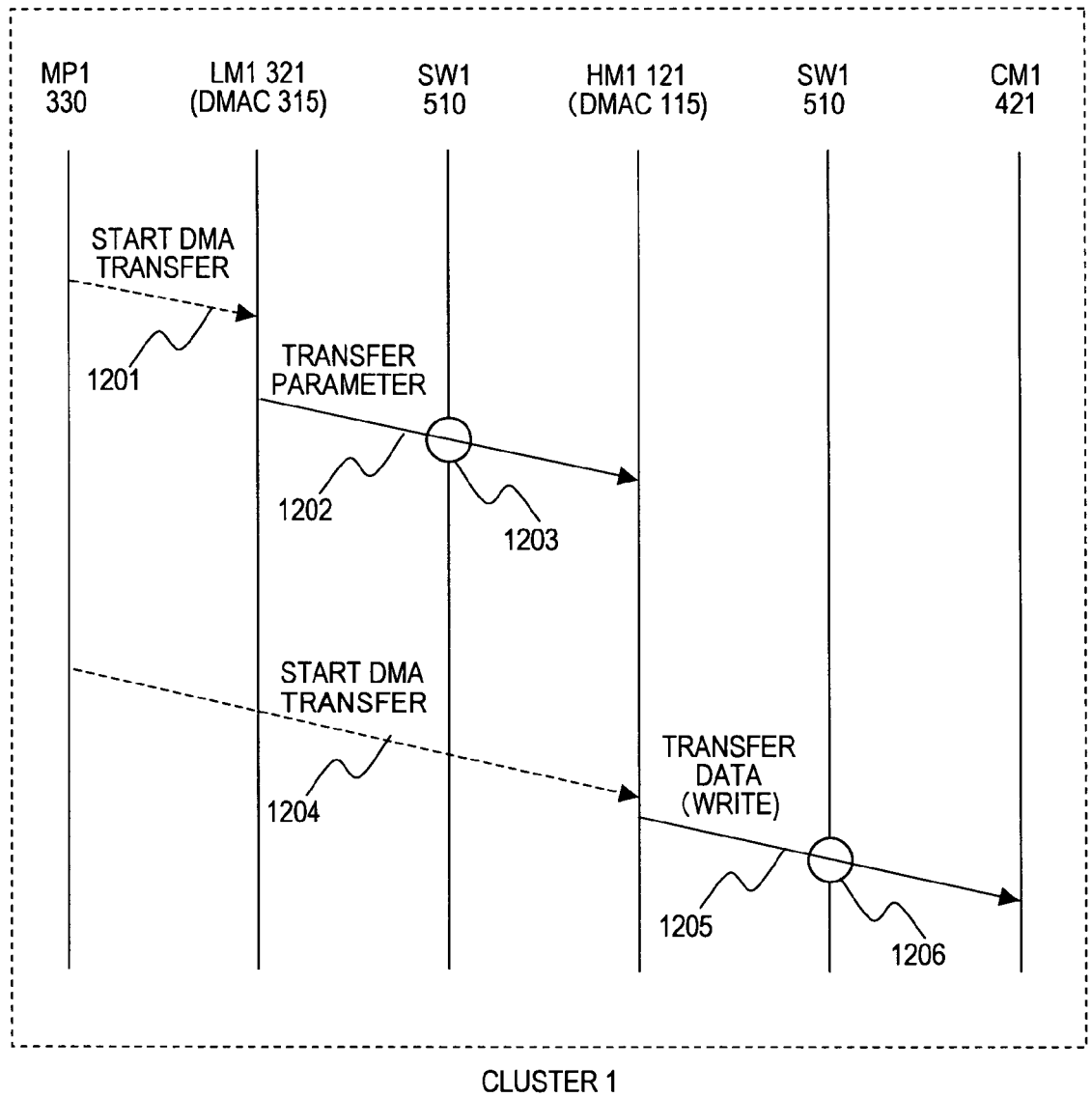
FIG. 14 is a sequence diagram of data transfer processing in a cluster of the third embodiment of this invention.

FIG. 14 is a sequence diagram of data transfer processing in a cluster using the DMA of the third embodiment.

To start DMA transfer by the channel memory DMA controller 115, a DMA parameter must be notified to the DMA controller 115. Thus, the processor 330 creates a DMA transfer parameter in a processor memory 320 to start DMA transfer by the processor memory DMA controller 315 (1201). The processor memory DMA controller 315 transfers the DMA transfer parameter stored in the processor memory 320 to the channel memory 120 via the switch 510 (1202).

Subsequently, the processor 330 starts DMA transfer by the channel memory DMA controller 115 (1204). Then, the channel memory DMA controller 115 uses a transferred DMA parameter list to transfer data stored in the channel memory 120 to the cache memory 420 via the switch 510 (1205).

Accordingly, two DMA transfers, i.e., parameter transfer from the processor memory 320 to the channel memory 120 (1202) and data transfer from the channel memory 120 to the cache memory 420 (1205), are executed. In both data transfers, validity of the data transfer is verified by the switch access control unit 550 of the switch 510 (1203 and 1206). Thus, it is possible to protect data stored in the memory at the time of the data transfer.

Figure 15:
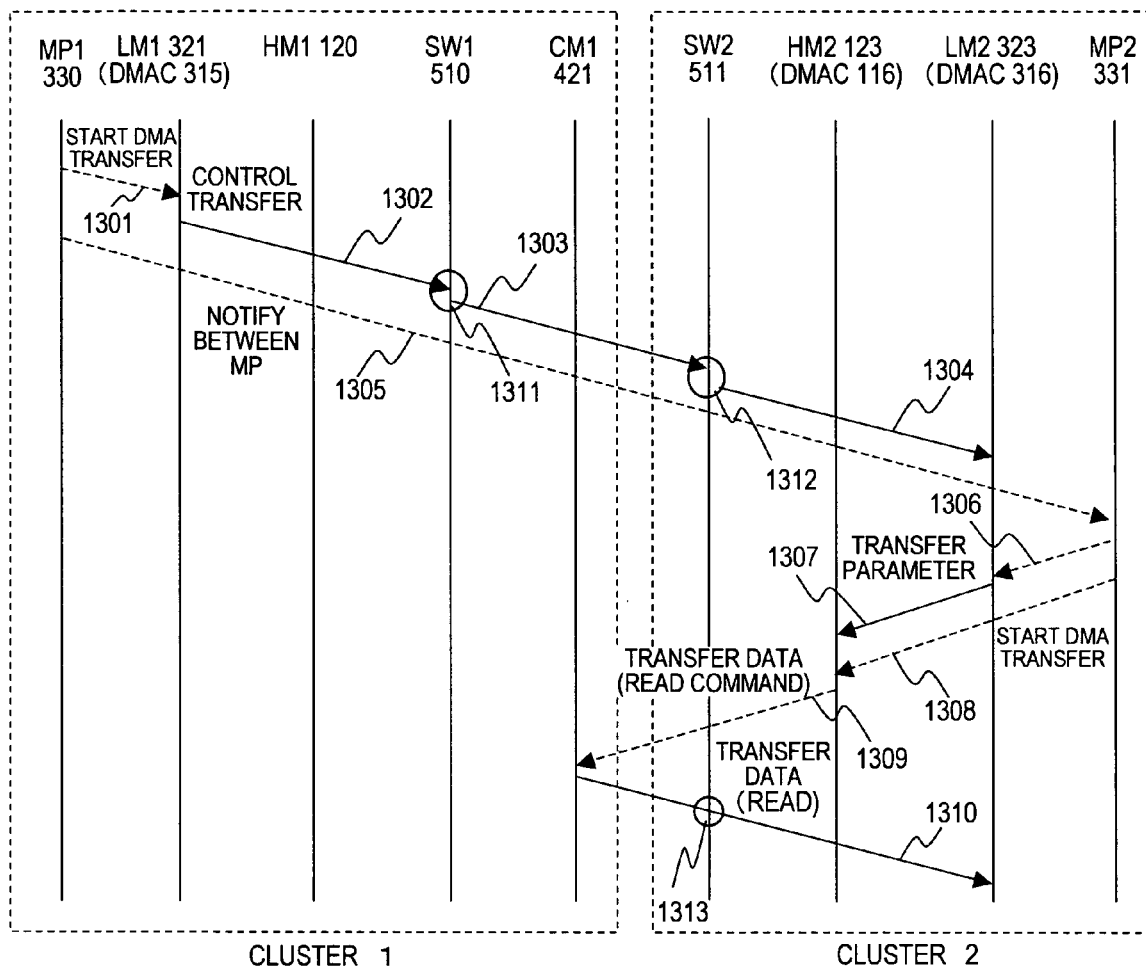
FIG. 15 is a sequence diagram of data transfer processing between the clusters of the third embodiment of this invention.

FIG. 15 is a sequence diagram of data transfer processing between clusters using the DMA of the third embodiment. FIG. 15 shows an operation flow in a case where data is transferred from a cache memory (CM1) 421 of a cluster 1 to a processor memory (LM2) 323 of a cluster 2. For the data transfer between the clusters, a READ mode only is permitted.

First, to start DMA transfer of data, the processor (MP1) 330 of the cluster 1 requests the processor (MP2) 331 of the cluster 2 to execute READ transfer from the cache memory (CM1) 421 of the cluster 1. Accordingly, the processor 330 creates control information in the processor memory 321 to start DMA transfer by the processor memory DMA controller 315 (1301). Then, the processor memory DMA controller 315 transfers the control information stored in the processor memory (LM1) 321 to the processor memory (LM2) 323 via the switch (SW1) 510 and the switch (SW2) 511 (1302, 1303, and 1304). Further, the processor (MP1) 330 requests the processor (MP2) 331 to process the transferred control information through interprocessor notification.

Then, the processor (MP2) 331 starts DMA transfer by the processor memory DMA controller 316 (1306). The processor memory DMA controller 316 transfers a DMA transfer parameter contained in the control information stored in the processor memory (LM2) 323 to the channel memory 120 (1307).

Subsequently, the processor (MP2) 33 starts DMA transfer by the channel memory DMA controller 116 (1308). The channel memory DMA controller 116 uses a transferred DMA parameter list to transmit a READ command to the cache memory (CM1) 421 of the cluster 1 (1309), and transfers data stored in the cache memory 421 of the cluster 1 to the processor memory 323 via the switch (SW1) 510 and the switch (SW2) 511 (1310).

In both data transfers, validity of the data transfer is verified by the access control units 550 and 551 of the switches 510 and 511 (1311, 1312, and 1313). Thus, it is possible to protect data stored in the memory at the time of the data transfer.

Seen from the cluster 2 which is a data transfer destination, the DMA controller of its own cluster fetches data of another cluster, so this processing is called a READ mode. By transferring data between the clusters in the READ mode, no data is written in the memory area of the other cluster. Accordingly, it is possible to protect data stored in the memory without writing data in the memory of the other cluster.

Next, data transfer restriction conditions of the third embodiment will be described.

FIG. 7 shows transfer restriction conditions in the case of intercluster transfer. In this definition example, for intercluster transfer, only the transfer between the processor memories, transfer from the cache memory to the channel memory, and data transfer from the cache memory to the processor memory are permitted. Additionally, for data transfer from the cache memory, the READ mode alone is permitted.

As described above, according to the disk controller of the third embodiment, since the switch access control unit 550 verifies whether data transfer between the clusters can be executed and transfers only the consistency-checked packet, it is possible to prevent improper transfer. Thus, the data at the time of the data transfer between the clusters and between the memories is protected, and the data stored in the memory can be protected. Hence, it is possible to achieve higher reliability of the disk controller.

According to the disk controller of the third embodiment, in the packet transfer between the clusters of the disk controller, execution of the transfer is permitted only when the DMA controller belonging to the transfer destination cluster starts the DMA transfer, whereby no data is written in the memory area of the other cluster. Thus, it is possible to protect data stored in the memory of the other cluster, increase independence of modules of one another, and achieve higher reliability of the disk controller in cluster configuration.

Fourth Embodiment

A fourth embodiment of this invention will be described below by referring to FIG. 13.

In the disk controller shown in FIG. 13, the channel memory 120 of the cluster 1 is divided into a channel memory data area 121 and a channel memory control area 122. The processor memory 320 of the cluster 1 is divided into a processor memory data area 321 and a processor memory control area 322. The cache memory 420 of the cluster 1 is divided into a cache memory data area 421 and a cache memory control area 422. Similarly, the channel memory of the cluster 2 is divided into a channel memory data area 123 and a channel memory control area 124. The processor memory of the cluster 2 is divided into a processor memory data area 323 and a processor memory control area 324. The cache memory of the cluster 1 is divided into a cache memory data area 423 and a cache memory control area 424.

FIGS. 16A to 16C each show a specifically subdivided memory area.

As shown in FIG. 16A, the channel memory is divided into a data area and a control area, and each divided area is subdivided for each connection port. Additionally, a shared area is disposed as an area that can be shared by all the connection ports.

Similarly, as shown in FIG. 16B, the processor memory is divided into a data area and a control area, and each divided area is subdivided for each processor for executing processing. Additionally, a processor unit shared area is disposed as an area to be shared by all the processors arranged in the same processor unit.

Similarly, as shown in FIG. 16C, the cache memory is divided into a data area and a control area.

Unique internal network address spaces which do not overlap one another in all the memory areas of all the modules are imparted to those areas. Accordingly, by identifying an internal network address, an area containing the address can be specified. Hence, the access control unit can protect data stored in the memory by verifying the validity of data transfer between the memories, thereby achieving higher reliability of the disk controller.

Figure 17A:
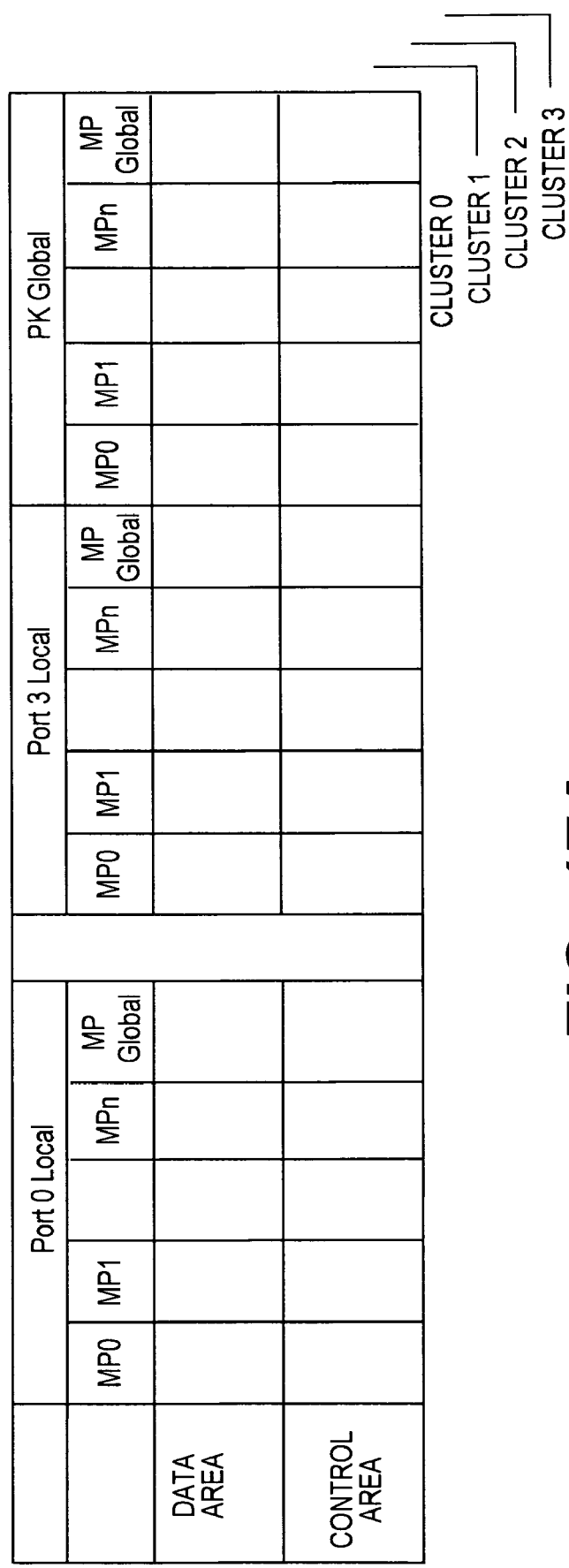
FIG. 17A is a diagram showing the divided memory area according to the fourth embodiment of this invention.
Figure 17B:
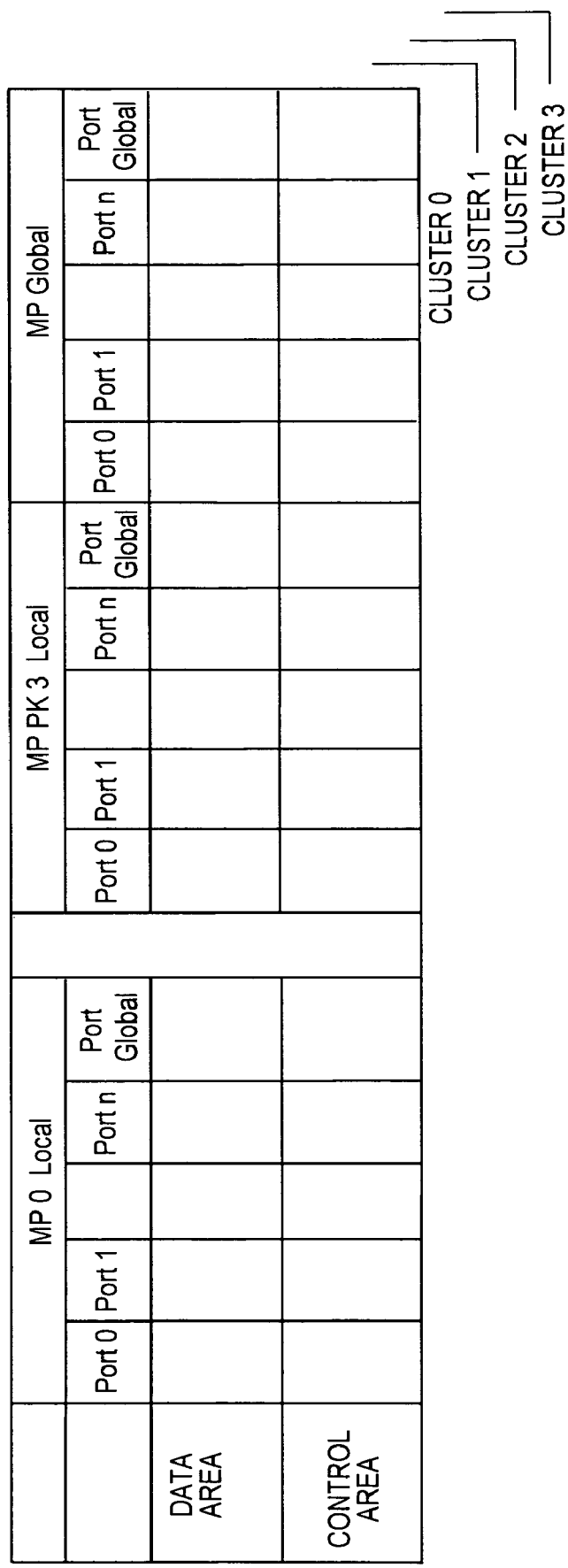
FIG. 17B is a diagram showing the divided memory area according to the fourth embodiment of this invention.

FIGS. 17A to 17C each show a modified example of the specifically subdivided memory area.

As shown in FIG. 17A, the channel memory is divided into a data area and a control area, and each divided area is subdivided for each connection port and each processor for executing processing. A unit shared area is disposed as an area to be shared by all the connection ports, and the unit shared area is also subdivided for each processor for executing processing.

As shown in FIG. 17B, the processor memory is divided into a data area and a control area, and each divided area is subdivided for each processor for executing processing and for each connection port. A processor unit shared area is disposed as an area to be shared by all the processors arranged in the same processor unit, and the processor unit shared area is also subdivided for each connection port.

As shown in FIG. 17C, the cache memory is divided into a data area and a control area. Each divided area is subdivided for each processor for executing processing.

As described above, according to the disk controller of the fourth embodiment, unique internal network addresses which do not overlap one another in all the memory areas of all the components are imparted to those areas. Thus, by subdividing the memory areas in this way, it is possible to further specifically specify the attributes of areas including the internal network address. Hence, by further specifically specifying the attributes of the memory areas by the access control unit, it is possible to protect data stored in the memory more securely, and to achieve higher reliability of the disk controller.

In particular, by dividing the memory area into the data area for storing data from the host computer and the control area for storing data for controlling the operation in the disk controller, it is possible to protect user data from troubles more securely.

Further, by subdividing the data area and the control area for each connection port with the host computer and each processor for controlling the packet transfer, it is possible to protect user data more securely.

While the present invention has been described in detail and pictorially in the accompanying drawings, the present invention is not limited to such detail but covers various obvious modifications and equivalent arrangements, which fall within the purview of the appended claims.

What is claimed is:

1. A disk controller for controlling data transfer between a host computer and a disk drive, comprising:
    a channel unit including a channel memory;
    a cache unit including a cache memory;
    a control unit for controlling the data transfer, wherein,
        said channel memory is divided to a plurality of memory areas each having a different attribute,
        said cache memory is divided to a plurality of memory areas each having a different attribute;
    the data transferred to/from the host computer is transferred in a packet between the channel memory and the cache memory; and
    the control unit decides whether the transfer between the channel memory and the cache memory can be permitted by verifying consistency of information included in a header of the packet to be transferred when the packet is transferred;
    wherein the control unit specifies a first attribute of a first memory area of a source of the transfer between the channel memory and the cache memory and a second attribute of a second memory area of a destination of the transfer based on a transfer source address of the packet and a transfer destination address of the packet;
    wherein the first attribute indicates whether the first memory area is to store control information or the first memory area is to store user data;
    wherein the second attribute indicates whether the second memory area is to store control information or the second memory area is to store user data; and
    wherein the control unit permits the transfer when the first attribute indicates the first area is to store control information and the second attribute indicates the second area is to store control information or when the first attribute indicates the first area is to store user data and the second attribute indicates the second area is to store user data.

2. The disk controller according to claim 1, further comprising a switch unit for coupling the channel unit and the cache unit to form an internal network,
    wherein the switch unit transfers the packet between the channel memory and the cache memory via the internal network, and includes the control unit to verify the consistency of the information included in the header of the packet to be transferred when the packet is transferred.

3. The disk controller according to claim 1, wherein at least one of the channel unit and the cache unit includes the control unit to verify the consistency of the information included in the header of the packet to be transferred when the packet is transferred.

4. The disk controller according to claim 1, further comprising a switch unit coupled to another disk controller,
    wherein the switch unit transfers the packet with the other disk controller, and includes the control unit to verify the consistency of the information included in the header of the packet to be transferred when the packet is transferred between the disk controllers.

5. The disk controller according to claim 4, wherein:
    at least one of the channel unit and the control unit includes a DMA controller for executing the packet transfer; and
    the control unit permits the packet transfer when the transfer is executed by the DMA controller included in the disk controller of a destination of the packet transfer, and inhibits the packet transfer when the transfer is executed by the DMA controller included in the disk controller of a source of the packet transfer when the packet is transferred between the disk controllers.

6. The disk controller according to claim 1, wherein at least one of the channel unit and the control unit includes a direct memory access (DMA) controller for executing the packet transfer.

7. The disk controller according to claim 1, wherein:
    a storage area of each memory is divided into a data area for storing data transmitted from the host computer and a control area for storing data for controlling an operation in the disk controller; and
    the control unit verifies the consistency between a memory area of a source of the packet transfer and a memory area of a destination of the packet transfer based on the information included in the header of the packet to be transferred when the packet is transferred.

8. The disk controller according to claim 7, further comprising a processor for controlling the transfer of the data, wherein:
    the data area and the control area are further divided into an area used by a connection port with the host computer and an area used by the processor for controlling the packet transfer; and
    the control unit verifies the consistency between the memory area of the source of the packet transfer and the memory area of the destination of the packet transfer based on the information included in the header of the packet to be transferred when the packet is transferred.

9. The disk controller according to claim 1, wherein:
    the disk controller holds transfer permitting conditions defining conditions of a transfer permission based on a relation among the attributes of the area of the source of the packet transfer, the attributes of the area of the destination of the packet transfer, and a transfer command for the packet transfer; and
    the control unit refers to the transfer conditions to permit the transfer in a case where a permission is given by the transfer conditions referred to.

10. A data transfer control method for use in a disk controller for controlling data transfer between a host computer and a disk drive, the disk controller comprising a channel unit having a channel memory and a cache unit having a cache memory,
    the data transfer control method comprising:
    deciding, by a control unit, whether the transfer between the channel memory and the cache memory can be permitted by verifying consistency of information included in a header of a packet to be transferred when data is transferred through the packet between the channel memory and the cache memory; and
    transferring the packet when it is decided that the transfer is permitted;
    wherein,
        the channel memory is divided to a plurality of memory areas each having a different attribute, the cache memory is divided to a plurality of memory areas each having a different attribute;

the control unit specifies a first attribute of a first memory area of a source of the transfer between the channel memory and the cache memory and a second attribute of a second memory area of a destination of the transfer based on a transfer source address of the packet and a transfer destination address of the packet;

the first attribute indicates whether the first memory area is to store control information or the first memory area is to store user data;

the second attribute indicates whether the second memory area is to store control information or the second memory area is to store user data; and the control unit permits the transfer when the first attribute indicates the first area is to store control information and the second attribute indicates the second area is to store control information or when the first attribute indicates the first area is to store user data and the second attribute indicates the second area is to store user data.

11. The data transfer control method according to claim 10, wherein:

the disk controller is coupled to another disk controller; and the data transfer control method further comprises verifying, by the control unit, the consistency of the information included in the header of the packet to be transferred when the packet is transferred between the disk controllers.

12. The data transfer control method according to claim 10, wherein:

at least one of the channel unit and the control unit includes a DMA controller for executing the packet transfer; and the method further comprises permitting, by the control unit, the packet transfer when the transfer is executed by the DMA controller included in the disk controller of a destination of the packet transfer, and inhibits the packet transfer when the transfer is executed by the DMA controller included in the disk controller of a source of the packet transfer when the packet is transferred between the disk controllers.

13. The data transfer control method according to claim 10, wherein:

a storage area of each memory is divided into a data area for storing data transmitted from the host computer and a control area for storing data for controlling an operation in the disk controller; and the method further comprises verifying, by the control unit, the consistency between a memory area of a source of the packet transfer and a memory area of a destination of the packet transfer based on the header information of the packet to be transferred when the packet is transferred.

14. The data transfer control method according to claim 13, wherein:

the disk controller further comprises a processor for controlling the transfer of the data;

the data area and the control area are further divided into an area used by a connection port with the host computer and an area used by the processor for controlling the packet transfer; and the method further comprises verifying, by the control unit, the consistency between the memory area of the source of the packet transfer and the memory area of the destination of the packet transfer based on the information included in the header of the packet to be transferred when the packet is transferred.

15. The data transfer control method according to claim 10, further comprising:

specifying, by the control unit, attributes of a memory area of a source of the packet transfer and a memory area of a destination of the packet transfer based on a transfer source address of the packet and a transfer destination address of the packet; and deciding, by the control unit, whether the transfer can be permitted based on a transfer command of the packet and the specified area attributes.

16. The data transfer control method according to claim 15, further comprising permitting, by the control unit, the transfer when the attributes of the area of the source of the packet transfer and the area of the destination of the packet transfer match each other.

17. The data transfer control method according to claim 15, wherein:

the disk controller holds transfer permitting conditions defining conditions of a transfer permission based on a relation among the attributes of the area of the source of the packet transfer, the attributes of the area of the destination of the packet transfer, and a transfer command for the packet transfer; and the method further comprises referring, by the control unit, to the transfer conditions to permit the transfer in a case where a permission is given by the transfer conditions referred to.

18. The disk controller according to claim 1, wherein the channel memory is divided into a first memory area having a data area attribute and a second memory area having a control area attribute, and wherein the cache memory is divided into a third memory area having a data area attribute and a fourth memory area having a control area attribute.

* * * * *